| LENS | GLASS | | RADII | THICKNESS | SPACING |
|---|---|---|---|---|---|
| 1 Front Lens 10a | DF-2 $N_D=1.617$ | $V=36.6$ | $R_1=+3189.00$<br>$R_2=-76.00$ | $t_1=3.00$ | |
| 2 Front Lens 10a | DBC-2 $N_D=1.617$ | $V=54.9$ | $R_3=+76.67$<br>$R_4=-3189.00$ | $t_2=6.00$ | $l_1$=variable for focusing only from 1.10 to 7.10 |
| 3 Variator Lens 13 | DBC-1 $N_D=1.611$ | $V=58.8$ | $R_5=+56.70$<br>$R_6=-262.00$ | $t_3=6.50$ | $l_2$=variable from 5.00 to 35.00 |
| 4 Erector Lens 15 | BF-2 $N_D=1.6053$ | $V=43.6$ | $R_7=-124.70$<br>$R_8=-24.75$ | $t_4=2.80$ | $l_3$=variable from 38.23 to 8.23 |
| 5 Compensator Lens 14 | DBC-1 $N_D=1.611$ | $V=58.8$ | $R_9=+26.31$<br>$R_{10}=$ PLANO | $t_5=3.10$ | $l_4$=variable from 3.93 to 33.93 |
| 6 Relays 16 | DBC-1 $N_D=1.611$ | $V=58.8$ | $R_{11}=+18.17$<br>$R_{12}=+172.00$ | $t_6=2.50$ | $l_5$=variable from 32.91 to 2.91 |
| 7 Relays 16 | DF-1 $N_D=1.621$ | $V=36.2$ | $R_{13}=-20.05$<br>$R_{14}=-16.25$ | $t_7=0.75$ | $l_6=$ 3.80 |
| 8 Relays 16 | DBC-1 $N_D=1.611$ | $V=58.8$ | $R_{15}=+96.95$<br>$R_{16}=+16.75$ | $t_8=2.50$ | $l_7=$ 4.20 |
| | | | | | $l=$ 24.85 |

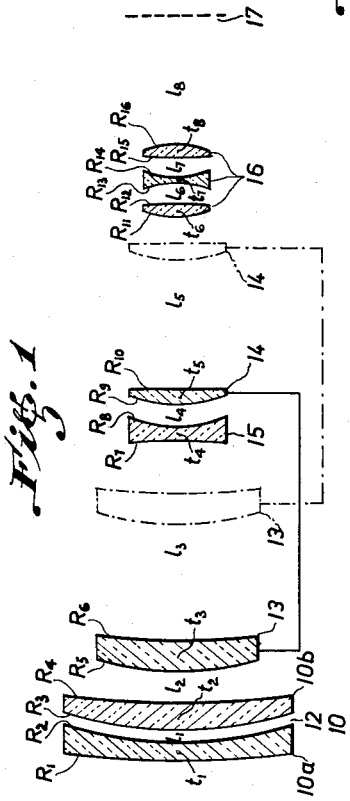

United States Patent Office 2,718,817
Patented Sept. 27, 1955

2,718,817

VARIFOCAL LENS SYSTEM FOR MOTION PICTURE AND TELEVISION CAMERAS

Frank G. Back, New York, and Herbert Lowen, Forest Hills, N. Y.

Application October 16, 1952, Serial No. 315,088

5 Claims. (Cl. 88—57)

The present invention relates to varifocal lenses for use in connection with moving picture cameras and television cameras. In conventional practice the zoom effect is accomplished by merely moving the camera toward or away from the object. The varifocal lens can change its characteristic from that of a wide angle lens to that of a telephoto lens, or vice-versa in one continuous sweep. On the screen a shot taken with such a lens, creates the impression of a zoom although neither camera nor object have changed their respective positions and only the lens has been changed from one characteristic (wide angle lens) to the other characteristic (telephoto lens) or vice-versa.

The first varifocal lens which was fully suitable for use by the motion picture and television industry was put on the market in 1946 and is fully described in my U. S. Patent 2,454,686.

This varifocal lens set forth in U. S. Patent 2,454,686, while constituting a substantial improvement over the conventional type of zoom lens still presented a large number of difficulties and disadvantages.

It is the object of the present invention to overcome these disadvantages inherent in the device set forth and described in U. S. Patent 2,454,686, in which the lens substantially consists of one single movable barrel which moves linearly. The image remains in focus regardless of the movement of the barrel. The optical construction consists of three stationary lens groups and two movable lens groups which image the object to be filmed twice forming three real images. As these images change not only their size but also their position, this has to be compensated for by forming a third image which seems to remain stationary in space. This arrangement requires a rather complex optical construction for the lens necessitating a considerable number of lens elements. In order to keep the overall length of the system in reasonable proportions the lens groups between the images had to have considerable power and had to be split up into several components. The great number of elements thus required caused a substantial decrease in light transmission even when anti-reflection coatings were applied to each of the glassair surfaces. All these lens groups had to have positive powers and therefore caused a strong Petzval curve. Field flattening had to be achieved by introducing either negative astigmatism or distortion.

It is an object of the present invention to provide a new zoom lens of simple construction maintaining the principle of single barrel linear movement.

It is a further object of the present invention to provide a zoom lens the lens groups of which are constructed of a small number of lens elements and in which the necessity of forming two intermediate images which was a prerequisite requirement in the former construction has been eliminated.

It is a further object of the present invention to provide a new construction for zoom lenses requiring a small number of lens groups of low power which accordingly will not cause a marked decrease in light transmission.

It is a further object of the present invention to provide a varifocal lens with a small number of lens elements and to decrease the Petzval sum to substantially zero by using negative and positive elements and obtaining a substantially flat field without the necessity of introducing aberrations.

It is a further object of the present invention to provide a new construction for zoom lenses in which the physical dimensions of the system are independent of the optical spacing between the different successive images and therefore the length of the system is that of a standard motion picture lens.

A preferred embodiment of this invention is shown in the accompanying drawing in which:

Fig. 1 is a schematic view showing the movable lens system in forward position, and the dotted lines show the lens system in rearward position illustrating the movement of the movable lens elements;

Fig. 2 is a table exemplifying the same.

Having now reference to the drawings, it will be seen that the principle of the device is diagrammatically set forth as a view representing an axial cross-section through the device.

A lens system in accordance with the present invention comprises the following lenses: a front lens assembly 10 comprising front lenses 10a and 10b having a variable gap 12 there between behind which movably is arranged the variator lens 13 and the compensator lens 14 which lenses 13 and 14 constitute the movable means of the structure, in one position constituting the telephoto arrangement and in the other position constituting the wide angle system.

Stationary between the variator lens 13 and the compensator lens 14 the erector lens 15 is located and behind the variator lens 14 the relay 16 is located behind which the film 17 is arranged.

The relative spacings between the front lens 10 and the erector 15 and the relay 16 remains predetermined and stationary while the position of the variator lens 13 with respect to the erector 15 is changeable and likewise the relative distance of the compensator 14 with respect to the erector 15 and the relay 16 is changeable in such manner that distance between the variator 13 and the erector 15 increases by the same amount by which the distance between the compensator 14 and the erector 15 decreases and vice-versa.

This compensator 14 has to have the following characteristics: If $m$ is the movement of the lens barrel and $t$ is the travel of the virtual image formed by the erector, $f$ the focal length of the compensator lens, and $L$ the distance from the virtual image to the compensator lens at the front position of the variator and $L'$ distance of the real image formed by the compensator lens of this virtual image then the equation, $$\frac{1}{L-(m-t)}+\frac{1}{f}=\frac{1}{L'-m}$$

has to be fulfilled for every position of the movable lens barrel. In other words, the focal length of the compensator lens and its spacing in the optical system has to be chosen in such a way that if the object distance of the lens is changed by an amount of $m-t$ then the image distance must change by the amount of $m$.

The movement of the variator lens 13 and the corresponding movement of the compensator lens 14 relative to the front lens 10, the erector 15 and the relay 16 is such that if a total travel of the movable lens from forward to rearward is traversed a distance of 30 mm. is traversed and the instrument will cover a range of from 1 to 3. The equivalent focal length will be from 25 to 75 mm.

In the present arrangement the front lens assembly 10 in combination with the variator 13 forms a real inverted image of the object. This real inverted image is a virtual object for the stationary erector lens 15 which forms a virtual upright image of the object. The compensator 14 employs the upright virtual image of the erector lens 15 to form an inverted, real image of the object in such a way that this inverted real image remains stationary in space. The relay 16 uses the real inverted image of the compensator 14 as virtual object and forms of it a real, inverted image on the film plane, the image being reduced to the desired size. The front lens consisting of a positive and a negative element spaced apart by a variable air gap to permit focusing on objects at finite distances.

An example of the invention illustrated particularly in Figure 1 and having the following values, also given in Figure 2 of the drawings as:

| Lens | Glass | Radii | Thickness | Spacing |
|---|---|---|---|---|
| 1. Front Lens 10a | DF-2<br>$N_D=1.617$  $V=36.8$ | $R_1 = +3189.00$<br>$R_2 = -76.00$ | $t_1=3.00$ | $l_1$=Variable for focusing from 1.10 to 7.10. |
| 2. Front Lens 10b | DBC-2<br>$N_D=1.617$  $V=54.9$ | $R_3 = + 76.67$<br>$R_4 = -3189.00$ | $t_2=6.00$ | $l_2$=Variable from 5.00 to 35.00. |
| 3. Variator Lens 13 | DBC-1<br>$N_D=1.611$  $V=58.8$ | $R_5 = + 56.70$<br>$R_6 = - 262.00$ | $t_3=6.50$ | $l_3$=Variable from 38.23 to 8.23. |
| 4. Erector Lens 15 | BF-2<br>$N_D=1.6053$  $V=43.6$ | $R_7 = - 124.70$<br>$R_8 = - 24.75$ | $t_4=2.80$ | $l_4$=Variable from 3.93 to 33.93. |
| 5. Compensator Lens 14 | DBC-1<br>$N_D=1.611$  $V=58.8$ | $R_9 = + 26.31$<br>$R_{10}=$ plano | $t_5=3.10$ | $l_5$=Variable from 32.91 to 2.91. |
| 6. Relay 16 | DBC-1<br>$N_D=1.611$  $V=58.8$ | $R_{11}=+ 18.17$<br>$R_{12}=+ 172.00$ | $t_6=2.50$ | $l_6=3.80$. |
| 7. Relay 16 | DF-3<br>$N_D=1.621$  $V=36.2$ | $R_{13}=- 20.05$<br>$R_{14}=- 16.25$ | $t_7=0.75$ | $l_7=4.20$. |
| 8. Relay 16 | DBC-1<br>$N_D=1.611$  $V=58.8$ | $R_{15}=+ 96.95$<br>$R_{16}=+ 16.75$ | $t_8=2.50$ | $l_8=24.85$ to film plane. |

Wherein (R) indicates radii (t) indicates thickness (l) indicates spacing ($N_D$) indicates the index of refraction for sodium light (5893°A) and (V) indicates Abbe's dispersion number. The glass types are identified as (DF) dense flint; (DBC) dense barium crown; (BF) barium flint. Thickness and spacing are given in (mm.) millimeters.

The data of a lens system embodying the present invention have been given. It will be understood that these data are given by way of illustration only and not by way of limitation. The requirement is simply that the variator 13 and the compensator 14 move as an integral unit relative to the front lens 10, erector 15 and relay lens assemblies 16 which themselves are fixed as a single unit and the movable lens assemblies are moved relative to the fixed lens assemblies.

While in the above set forth preferred construction, specific elements have been recited in order to adequately illustrate the principles of this invention, it will be apparent to those skilled in the art that alterations and modifications in the construction and arrangement of the system may be made without thereby departing from the spirit of said invention. Changes of form, of details of construction and materials may be made without thereby departing from the spirit of invention set forth, which shall be limited only by the scope of the appended claims.

Having set forth our invention, what we desire to claim and secure by Letters Patent is:

1. A varifocal lens system for motion picture and television cameras and the like, comprising five lens groups axially aligned and air spaced apart, including three stationary lens groups and two axially movable lens groups, said stationary lens groups including a front lens assembly, a third lens assembly serving as negative erector lens means and a fifth lens assembly acting as a relay lens, said movable lens groups including a variator lens, positioned behind said front lens assembly and in front of said erector lens means, and a compensator lens means positioned behind the said erector lens means and in front of the said relay means, said front lens assembly, said erector lens means and said relay lens being fixedly positioned relative to each other and said variator lens and said compensator lens being fixedly positioned relative to each other and movable relative to the front lens assembly, the erector lens means and the relay lens to give a continuous range of focal adjustments.

2. A varifocal lens in accordance with claim 1 comprising a front lens assembly consisting of two lenses spaced apart and provided with a variable air-gap therebetween, the first of said lenses being a negative element and the second of said lenses being a positive element the variation of the air-gap therebetween permitting adjustment for focusing purposes.

3. In a varifocal lens, in accordance with claim 1, a front lens assembly of variable power, a variator lens behind said front lens assembly, an erector lens behind said variator lens, a compensator lens behind said erector lens, and a relay lens behind said compensator lens, said front lens, erector lens and relay lens being fixed relative to each other, said variator lens and said compensator lens being fixed with respect to each other, said lens assembly comprising said variator lens and said compensator lens fixedly positioned apart from each other, movable as a unit with respect to the front lens assembly, the erector lens and the relay lens, said erector lens being a negative lens.

4. In a varifocal lens, in accordance with claim 1, a stationary erector lens adapted to form an upright virtual image, from a real, inverted image formed by the front lens assembly and the variator lens, said image being the virtual object for said erector lens, the compensator lens means adapted to form an inverted, real image, substantially stationary in space, from said upright, virtual image formed by the erector lens, wherein said erector lens is a negative lens, and the lens elements employed in connection therewith are substantially of low power.

5. A varifocal lens, made substantially according to the following specifications:

| Lens | Glass | Radii | Thickness | Spacing |
|---|---|---|---|---|
| 1. Front Lens | DF-2<br>$N_D$=1.617  V=36.8 | $R_1$ = +3189.00<br>$R_2$ = − 76.00 | $t_1$=3.00 | |
| | | | | $l_1$=Variable for focusing from 1.10 to 7.10. |
| 2. Front Lens | DBC-2<br>$N_D$=1.617  V=54.9 | $R_3$ = + 76.67<br>$R_4$ = −3189.00 | $t_2$=6.00 | |
| | | | | $l_2$=Variable from 5.00 to 35.00. |
| 3. Variator | DBC-1<br>$N_D$=1.611  V=58.8 | $R_5$ = + 56.70<br>$R_6$ = − 262.00 | $t_3$=6.50 | |
| | | | | $l_3$=Variable from 38.23 to 8.23. |
| 4. Erector | BF-2<br>$N_D$=1.6053  V=43.6 | $R_7$ = − 124.70<br>$R_8$ = − 24.75 | $t_4$=2.80 | |
| | | | | $l_4$=Variable from 3.93 to 33.93. |
| 5. Compensator | DBC-1<br>$N_D$=1.611  V=58.8 | $R_9$ = + 26.31<br>$R_{10}$=plano | $t_5$=3.10 | |
| | | | | $l_5$=Variable from 32.91 to 2.91. |
| 6. Relay | DBC-1<br>$N_D$=1.611  V=58.8 | $R_{11}$=+ 18.17<br>$R_{12}$=+ 172.00 | $t_6$=2.50 | |
| | | | | $l_6$=3.80. |
| 7. Relay | DF-3<br>$N_D$=1.621  V=36.2 | $R_{13}$=− 20.05<br>$R_{14}$=− 16.25 | $t_7$=0.75 | |
| | | | | $l_7$=4.20. |
| 8. Relay | DBC-1<br>$N_D$=1.611  V=58.8 | $R_{15}$=+ 96.95<br>$R_{16}$=+ 16.75 | $t_8$=2.50 | |
| | | | | $l_8$=24.85 to film plane. |

Wherein (R) indicates radii (t) indicates thickness (l) indicates spacing ($N_D$) indicates the index of refraction for sodium light (5893° A) and (V) indicates Abbe's dispersion number. The glass types are identified as (DF) dense flint; (DBC) dense barium crown; (BF) barium flint. Thickness and spacing are given in (mm.) millimeters.

References Cited in the file of this patent

UNITED STATES PATENTS

| | | |
|---|---|---|
| 1,947,669 | Warmisham et al. | Feb. 20, 1934 |
| 2,159,394 | Mellor | May 23, 1939 |
| 2,165,341 | Capstaff | July 11, 1939 |
| 2,235,364 | Gramatzki | Mar. 18, 1941 |
| 2,353,565 | Kaprelian | July 11, 1944 |
| 2,454,686 | Back | Nov. 23, 1948 |
| 2,501,219 | Hopkins et al. | Mar. 21, 1950 |